United States Patent [19]

Speelman

[11] Patent Number: 4,493,224
[45] Date of Patent: Jan. 15, 1985

[54] REMOTE MANUAL SHIFTING MECHANISM

[75] Inventor: Paul L. Speelman, Fredericksburg, Ohio

[73] Assignee: Eaton Corporation, Cleveland, Ohio

[21] Appl. No.: 384,841

[22] Filed: Jun. 4, 1982

[51] Int. Cl.³ .......................... B60K 20/00; F16C 1/10
[52] U.S. Cl. ................................. 74/473 R; 74/501 R
[58] Field of Search ........................... 74/473 R, 501 R

[56] References Cited

U.S. PATENT DOCUMENTS

| | | | |
|---|---|---|---|
| 1,630,076 | 5/1927 | Schmidt | 74/501 R |
| 1,736,320 | 11/1929 | Melchor | 74/473 |
| 1,736,330 | 11/1929 | Schmidt | 74/473 |
| 1,820,501 | 8/1931 | Schmidt | 74/501 |
| 1,970,690 | 8/1934 | Churchill | 74/473 |
| 3,186,251 | 6/1965 | Quarfoot | 74/501 R |
| 4,143,560 | 3/1979 | Kinkade et al. | 74/473 R |
| 4,152,950 | 5/1979 | Langford | 74/473 R |
| 4,261,220 | 4/1981 | Gill | 74/501 R |
| 4,270,403 | 6/1981 | West | 74/501 R |

FOREIGN PATENT DOCUMENTS

| | | | |
|---|---|---|---|
| 357893 | 1/1906 | France | 74/501 |
| 1595342 | 8/1981 | United Kingdom | 74/501 R |

*Primary Examiner*—Allan D. Herrmann
*Assistant Examiner*—Michael J. Gonet
*Attorney, Agent, or Firm*—C. H. Grace; A. E. Chrow

[57] ABSTRACT

Disclosed is a mechanism for manually shifting gears of a transmission from a remote operating station control lever. The mechanism features a rotatable slideable member having a protuberance that extends through an opening in the transmission casing and is adapted to move rail members within the transmission for engaging the gear combinations desired. The slideable member is preferably connected to the control lever by flexible cables such that movement of the lever along one axis causes the slideable member to rotate so as to position the protuberance adjacent the rail member desired. In one embodiment the slideable member is pivotally mounted to a rotatable member which is preferably connected to the control lever by a flexible cable such that movement of the control lever along a different axis causes the rotatable member to rotate which causes the slideable member to slide along a defined path and move the rail member to which the protuberance is adjacent. In another embodiment, the cables or other connecting means connected between the control lever and the slideable member are used to both rotate and slide the slideable member along a defined path to cause the protuberance to impinge upon and move the rail member to effect the gear combination desired.

14 Claims, 5 Drawing Figures

1

REMOTE MANUAL SHIFTING MECHANISM

INTRODUCTION

The invention relates generally to a mechanism for shifting gears of a motor transmission and more particularly to a mechanism for manually shifting the gears of a vehicular transmission from a remotely located lever control.

BACKGROUND OF THE INVENTION

Many systems have been developed over the years for shifting gears of motor transmissions. Typically the gear combinations are engaged by moving what are known in the trade as rail members. The rail members are accessible through an opening in the transmission casing and are moveably mounted such that movement of a particular rail member in a particular direction will engage a particular gear combination. Generally, such systems have featured a complex arrangement of a multiplicity of components that are characteristically costly to manufacture and assemble as well as being noisy due to movement of their components in addition to creating difficulties in routing between the location of the transmission and the location at which the transmission is to be manually controlled. Examples of prior art manual gear shifting mechanism for vehicular transmissions can be respectively found in U.S. Pat. Nos. 3,082,638 and 3,765,261 which, although proportedly can be used to advantage in shifting gears of a transmission, are complex in their respective designs and are costly to manufacture.

There exists then a need to provide a mechanism for manually shifting gears in a motor transmission, from a remote operating control location that is simpler and less costly than the systems used in the past as well as enabling simple means of connecting the transmission to the operating station control that can be easily and effectively routed.

SUMMARY OF THE INVENTION

Accordingly, it is an object of this invention to provide a remote manual shifting mechanism for use in shifting gears of a motor transmission that is comprised of parts that are simple to manufacture and assemble.

It is another object of this invention to provide a remote manual shifting mechanism for use in shifting gears in a motor transmission from a remote operating station control that enables selection and engagement of the gear combinations of the transmission with a minimum number of moving parts.

It is a further object of this invention to provide a remote manual shifting mechanism for shifting gears in a motor transmission which enables a manual operating station control lever and the transmission to be operably connected together by a means that can be easily routed.

DESCRIPTION OF SOME PREFERRED EMBODIMENTS

Figure 1:
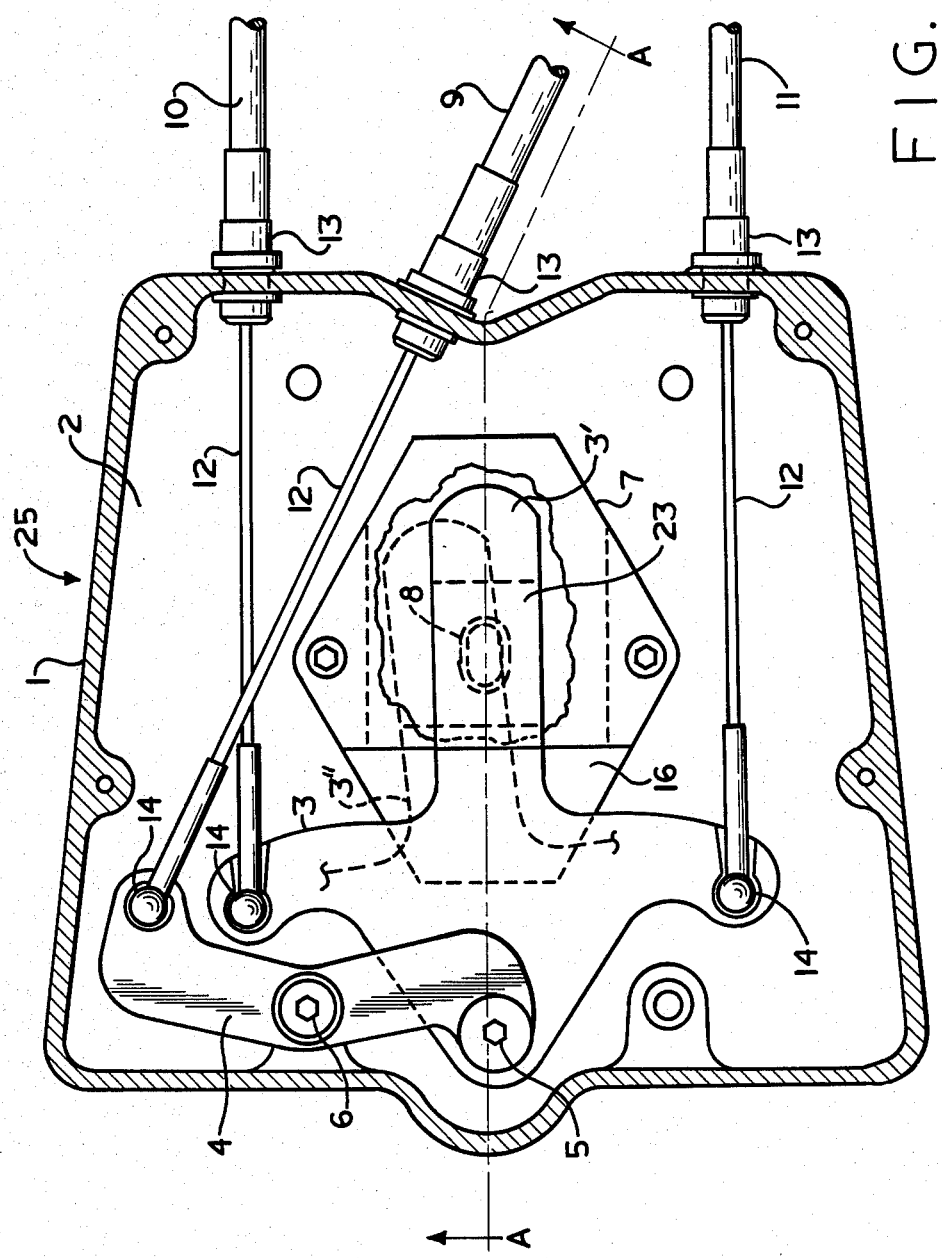
FIG. 1 shows a plan view of an embodiment of the mechanism of the invention with the top removed.

FIG. 1 shows a plan view of mechanism 25 with the top removed for purposes of illustrative convenience. Mechanism 25 comprises a housing 1 enclosing a cavity 2 in which are disposed slideable body member 3 and rotatable body member 4. Housing 1 is adapted to be secured to the outer surface of the transmission casing so that opening 23 in the bottom wall of housing 1 aligns with the opening of the transmission casing that provides an access to the transmission rail members previously described.

One end of body member 3 is pivotally mounted to one end of body member 4 by pivotal means 5. Body member 4 is secured to housing 1 by pivotal means 6. Body member 3 is able to slide in opposite directions along a defined path within cavity 2 for a distance sufficient to engage the gear combinations of the transmission to which housing 1 is secured. In FIG. 1 the defined path is generally parallel to viewing line A—A within cavity 2. The pivotal relationship between members 3 and 4 generally restricts the movement of member 3 to the defined path. The length of cavity 2 along the defined path is sufficient to permit the movement of body member 3 to engage the transmission gear combination desired as hereinafter described.

Body member 3 has an end 3' opposite to the one end thereof pivotally connected to body member 4 that is able to move in an arcuate path generally transverse to viewing line A—A as body member 3 pivots about pivotal means 5. For illustrative purposes, body member 3 is partially shown in dotted lines as body member 3" in one position along the arcuate path.

Control cables 9, 10 and 11 each have one end thereof secured to housing 1 by securement means 13. Each of cables 9, 10 and 11 have an outer protective jacket, not referenced, that is secured against movement with respect to housing 1 by securement means 13 and have a flexible moveable member 12 that is slidingly disposed within the protective jacket and which extends into cavity 2 through the wall of housing 1. Moveable member 12 of cables 10 and 11 are preferably connected by pivotal means 14 to body member 3 such that pulling upon moveable member 12 of cable 10 causes body member 3 to rotate in a clockwise direction about pivotal means 5 and pull moveable member 12 of cable 11 towards the viewer's left as viewed in FIG. 1. Moveable members 12 are moved by movement of a manual lever control more fully described with respect to FIG. 5. Likewise, moveable member 12 of cables 10 and 11 are connected to body member 3 such that pulling of moveable member 12 of cable 11 towards the viewer's right causes body member 3 to rotate counterclockwise about pivotal means 5 as viewed in FIG. 1 which in turn causes moveable member 12 of cable 10 to be pulled by body member 3 towards the viewer's left. By connecting moveable member 12 of cables 10 and 11 in such a manner, body member 3 is able to be rotated in opposite directions about pivotal means 5 without having to push upon member 12 of either cables 10 or 11, this arrangement greatly reduces the risk of kinking either or both members 12 of cables 10 and 11 or the cables themselves.

Moveable member 12 of cable 9 is pivotally connected by pivotal means 14 to an end of body member 4 opposite to the end that is pivotally mounted to body member 3 in such a manner that movement of member 12 of cable 9 in opposite directions is able to correspondingly rotate body member 4 in opposite directions about pivotal means 6 which is secured to housing 1. It can readily be seen that rotation of body member 4 about pivotal means 6 in a clockwise direction as viewed in FIG. 1 by pulling member 12 of cable 10 to the viewer's right causes body member 4 to rotate clockwise and cause body member 3 to slide within cavity 2 to the viewer's left along a defined path as previously described. Movement of member 12 of cable 10 to the viewer's left causes body member 4 to rotate counterclockwise and cause body member 3 to slide within cavity 2 towards the viewer's right along the defined path. As hereinafter described with respect to FIG. 5, the movement of member 12 of cable 9 is preferably limited so that it is only able to be pulled to the viewer's right and cause body member 3 to slide within cavity 2 to the viewer's left so that it is not necessary to have to push upon member 12 of cable 9 and unnecessarily cause member 12 or cable 9 to buckle as previously described.

Thus member 3 is able to rotate in opposite directions about pivotal means 5 depending upon the direction in which members 12 of cables 10 or 11 are moved. Also the control lever, as herinafter described with respect to FIG. 5, is preferably connected to the opposite ends of cables 10 and 11 and limited in movement so that either or both members 12 of cables 10 and 11 can be pulled but not pushed so as to minimize any tendency of kinking or binding of members 12 of cables 10 and 11.

Figure 5:
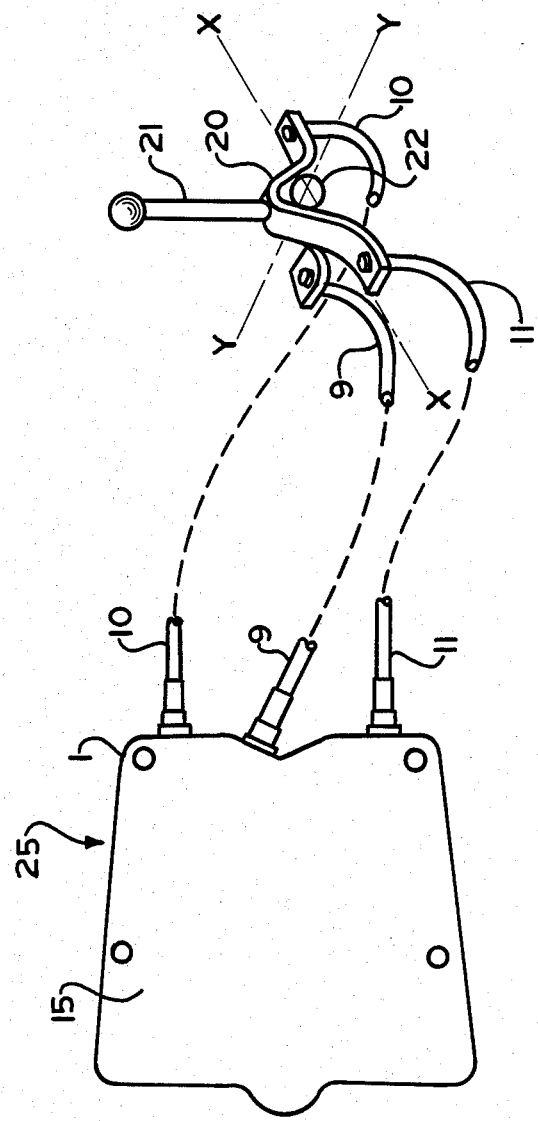
FIG. 5 shows a partial schematic view of a control lever connected by means of flexible cables to the embodiment of the mechanism of FIG. 1.

Likewise, the movement of the control lever, as of FIG. 5, is preferably limited such that an operator is only able to pull upon member 12 of cable 9 and cause body member 3 to slide within cavity 2 towards the viewer's left so as to minimize any tendency of kinking or binding of and between member 12 and cable 9. Once body member 3 has moved towards the viewer's left, it is then able to be moved towards the viewer's right by the simultaneous pulling upon members 12 of both cables 10 and 11 rather than having to push upon cable 9.

The rotation of body member 3 in opposite directions about pivotal means 5 causes end 3' of body member 3 to move in correspondingly opposite directions along the arcuate path previously described. The defined path along which body member 3 slides generally extends through member 7 whose top, not referenced, is broken away in FIG. 1 to show a better view of opposite end 3'. Member 7 provides a means of preventing vertical loading on pivotal means 5. The top of member 7 prevents end 3' from springing away from the bottom of member 7 and housing 1 and the transmission casing and insures that protuberance 8 is able to make contact with the rail members disposed within the transmission casing to which housing 1 and member 7 are secured as well as preventing vertical loading on pivotal means 5. Member 7 has a pair of side walls, not referenced, for supporting the top thereof that are spaced apart a sufficient distance to enable end 3' to travel in opposite directions along the arcuate path. Member 7 also has a bottom wall having a surface 16 thereof upon which member 3 is able to slide. Protuberance 8 extends from end 3' through opening 23 extending through the bottom of member 7 and through the bottom of housing 1. The movement of end 3' along the arcuate path causes protuberance 8 (best shown in FIG. 2) to likewise move along the same arcuate path.

Figure 2:
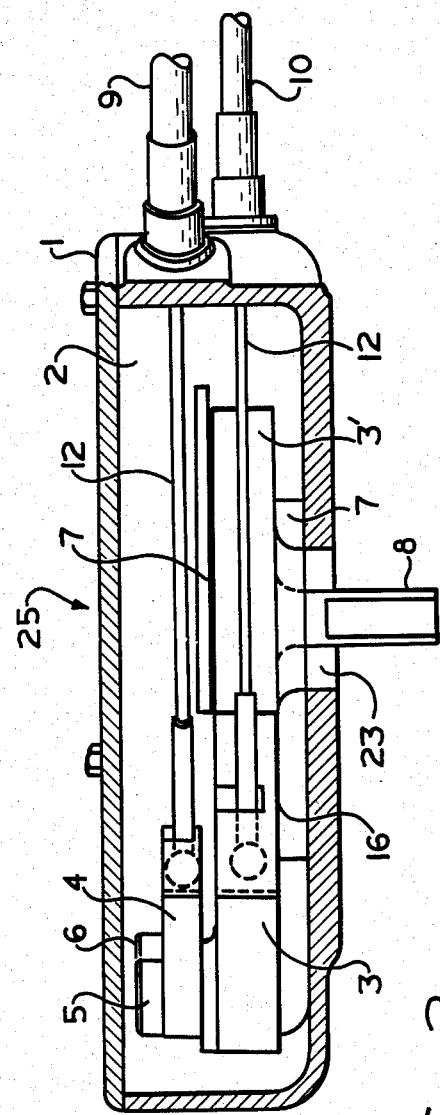
FIG. 2 shows a side elevation along line A—A of the embodiment of the mechanism of FIG. 1.

FIG. 2 shows a section of mechanism 25 of FIG. 1 taken along viewing line A—A. Mechanism 25 has a top 15 (not shown in FIG. 1) that in conjunction with housing 1 encloses cavity 2. Moveable members 12 of cables 9 and 10 extend into cavity 2 with moveable member 12 of cable 9 pivotally connected to body member 4 and moveable members 12 of cables 10 and 11 pivotally connected to body member 3 which is pivotally connected to body member 4 by pivotal means 5 as previously described.

Surface 16 of member 7 upon which member 3 is able to slide extends to the viewer's left beneath body member 3 as shown in FIGS. 1 and 2. Although member 7 is shown in FIGS. 1 and 2 as having a particular shape having a top and sides enclosing an open-ended channel through which body member 3 is able to slide and still be able to rotate about pivotal means 5 sufficiently to enable opposite end 3' of body member 3 to move along the arcuate path previously described, it is to be understood that, although preferred, member 7 may not be required and that where required any means of guiding body member 3 along a defined path in response to movement of body member 4 which also permits end 3' of body member 3 from springing away from the transmission casing and enables body member 3 to move in opposite directions along an arcuate path for a distance sufficient to position protuberance 8 adjacent the particular transmission rail member desired is considered to be within the scope of the invention. As previously described, protuberance 8 extends from end 3' of body member 3 through opening 23 in the bottom of housing 1 and member 7. Member 7 is secured to the bottom of housing 1 and housing 1 is secured to the transmission casing so that opening 23 is aligned with the opening in the transmission casing providing access to the rail members of the transmission.

Although it is preferred that mechanisms made in accordance with the invention have a housing preferably having a bottom wall, such as housing 1, which encloses body members 3 and 4 to protect them from damage and contamination, it is to be understood that such is not an absolute requirement and body member 4 may be secured directly to the transmission casing and body member 3 may slide and rotate directly upon a surface of the transmission casing where desired and suitable for a particular application. Although housing 1 may be made from any suitable material, it is preferably made from an aluminum alloy casting. Likewise although body members 3 and 4 and member 7 may be made from any suitable material, they are preferably made from steel.

Figure 3:
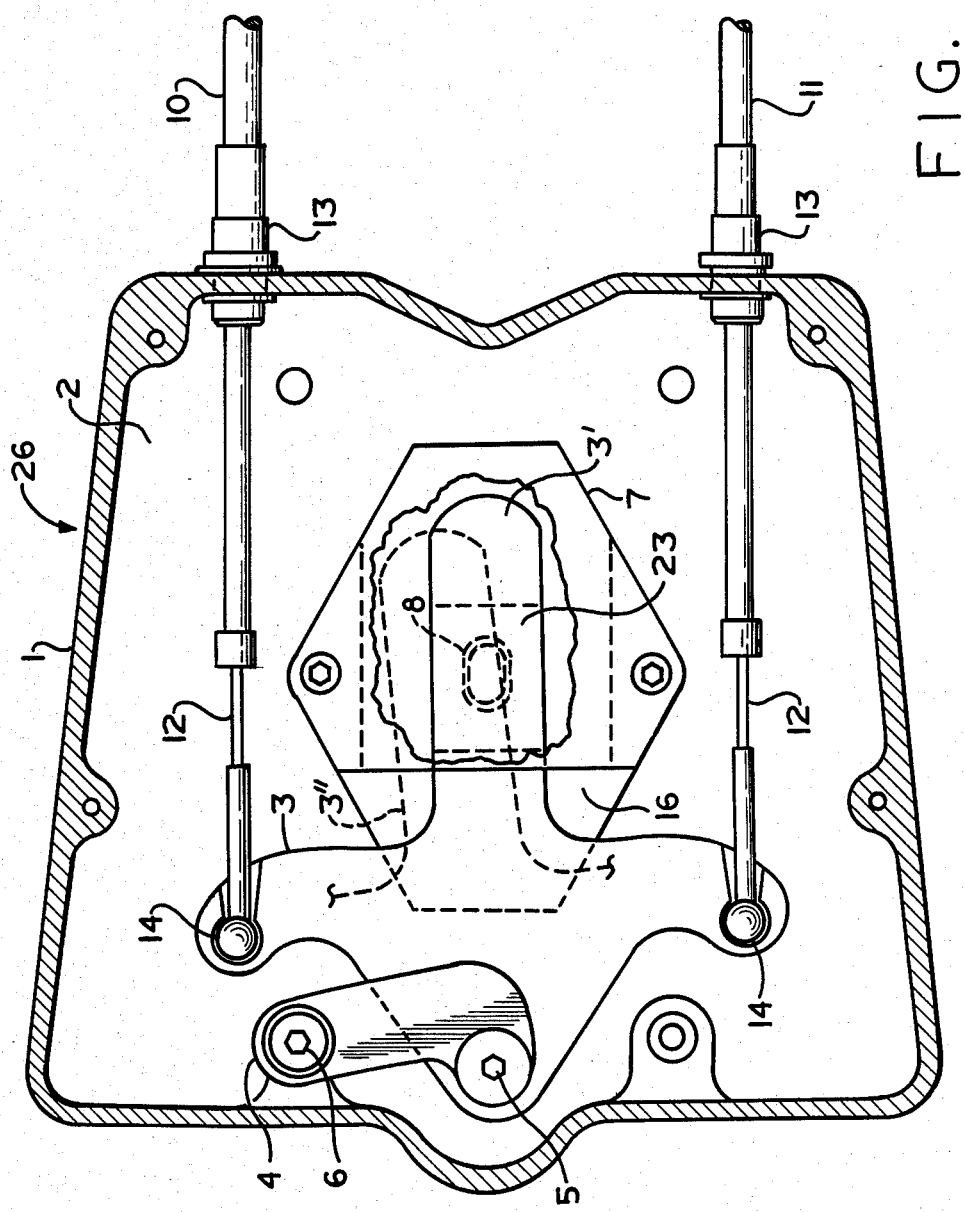
FIG. 3 shows a plan view of another embodiment of the mechanism of the invention with the top removed.

FIG. 3 shows a mechanism 26 of the invention in having a slideable body member 3 that is disposed slidingly within cavity 2 of housing 1. Member 3 is connected to the control lever, not shown, by means of moveable member 12 of cables 10 and 11 as previously described. The bottom of housing 1 and member 7 have an opening 23 therethrough through which protuberance 8 extends from opposite end 3' of member 3. Member 3 is pivotally mounted to one end of rotatable body member 4 by pivotal means 5. The opposite end of member 4 is pivotally mounted to housing 1 by pivotal means 5. The pivotal relationship between members 3 and 4 restrict the movement of member 3 to the defined path within cavity 2 of housing 1. Although it is preferred to restrict the movement of member 3 by means of rotatable member 4, other suitable means of restricting the movement of member 3 along the defined path may be used where desired.

In operation, movement of members 12 of cables 9 or 10 either to the viewer's right or left by the control lever will cause body member 3 to rotate about pivotal means 5 and cause opposite end 3' and protuberance 8 to move along an arcuate path as previously described. Movement of members 12 of both cables 9 and 10 simultaneously to the viewer's left will cause body member 3 to slide along a defined path towards the viewer's left which in turn will cause member 4 to pivot clockwise about pivotal means 6. When moveable members 12 of cables 9 and 10 are simultaneously moved by the control lever toward the viewer's right, member 3 is moved toward the viewer's right which in turn causes member 4 to rotate counterclockwise about pivotal means 6. In pivoting about pivotal means 6, member 4 is able to restrict the movement of member 3 to a defined path that is generally parallel to the direction in which the rail members are to be moved. The movement of protuberance 8 along the arcuate path enables it to be positioned adjacent the particular rail member selected and movement of body member 3 enables protuberance 8 to impinge upon and move the selected rail member sufficiently to engage the gear combinations arising from the movement of such selected rail member as previously described. It will be noted that moveable member 12 of mechanism 26 must be both pushed and pulled to obtain the movement of body member 3 desired whereas in mechanism 25 it is possible to only have to pull upon the members 12 to obtain the movement of body member 3 desired.

Figure 4:
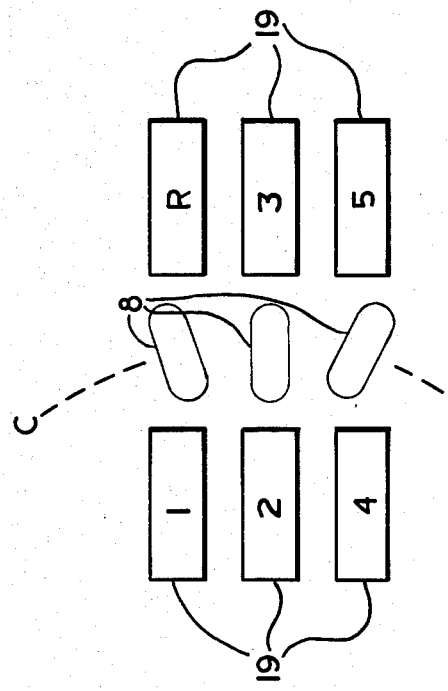
FIG. 4 shows a schematic plan view of one of the movements of a component of the mechanism along an arcuate path.

FIG. 4 shows a schematic diagram of the movement of a protuberance 8 along arcuate path C—C. The transmission has 6 rail members 19 denoting gears 1 through 5 and reverse (R). As end 3' is moved along arcuate path C—C, protuberance 8 is able to be positioned between rail members 1 and R or 2 and 3 or 4 and 5 as desired. The sliding of member 3 to the viewer's right along the defined path towards rail member R, or 3, or 5 enables protuberance 8 to impinge upon and move such rail member to engage the gear denoted and the sliding of body member 3 towards the viewer's left towards rail member 1, or 2, or 4 enables protuberance 8 to impinge upon and move such rail members to engage the gear denoted. Although six rail members are shown in FIG. 4, the mechanism of the invention may be used with any number of rail members provided protuberance 8 of body member is able to move along the arcuate path and be positioned adjacent each rail member and subsequently is able to impinge upon and move the rail member in response to the movement of body member 3 along the defined path.

FIG. 5 shows a schematic view of control lever 21 connected to mechanism 25 of FIGS. 1 and 2. Although any suitable method of pivotly mounting lever 21 may be used, lever 21 is shown secured to bracket 20 which is pivotally mounted on sphere 22 in such a manner that lever 21 can be moved in opposite directions along a first axis X—X and in opposite directions along a second axis Y—Y which is different from axis Y—Y and is typically orthoginal to axis X—X. Cables 9, 10 and 11 are connected to bracket 20 as shown in FIG. 5 so that movement of lever 21 along axis X—X towards the viewer's left is able to pull upon moveable member 12 disposed slidingly within cable 10 which in turn rotates slideable member 3 clockwise which in turn pulls upon moveable member 12 of cable 11 to prevent the operator from pushing upon cable 11 as previously described. Movement of lever 21 towards the viewer's right along axis X—X pulls upon moveable member 12 disposed slidingly within cable 11 which rotates slideable member 3 counterclockwise which in turn pulls upon moveable member 12 of cable 10 to prevent the operator from pushing upon cable 10 as previously described.

Cable 9 connects lever 21 to rotatable member 4 by means of the moveable member 12 disposed slidingly therewithin as previously described. Although lever 21 may be moved in opposite directions along axis Y—Y to rotate member 4 either clockwise or counterclockwise which in turn causes member 3 to slide along the defined path as previously described, it is preferred that cables 9, 10 and 11 be operably connected to lever 21 in such a manner that by moving lever 21 in one direction along axis Y—Y, member 12 of cable 9 pulls upon member 4 which in turn rotates and causes member 3 to slide towards the viewer's left which in turn pulls upon members 12 of cables 10 and 11 and movement of lever 21 in an opposite direction along axis Y—Y causes members 12 of cables 10 and 11 to simultaneously pull upon member 3 which in turn pulls upon member 12 of cable 9 as previously described.

Although it is preferred to use as least one flexible cable for connecting lever 21 to mechanisms made in accordance with the invention having a moveable member 12 slidingly disposed within an outer protective jacket that may comprise one or more layers of metallic and/or polymeric material as are well known to those skilled in the art of making such cables, singular flexible cables with no outer protective covering may be used where suitable for a particular application. Rods or other moveable linkages may be used in lieu of flexible cables.

Mechanisms of the invention using flexible cables as a means of connecting the manual control lever to the mechanism can be used to particular advantage in cab over engine type of vehicles in which the driver sits above the engine. In this case the flexible cables can be directed from the control lever towards the front of the cab and around the pivotal axis of the cab and then backwards toward the mechanism secured to the transmission. In this type of arrangement, the cab can be tilted upwards about its pivotal axis to provide access to the engine without having to dismantle or otherwise disconnect the cables.

What is claimed is:

1. A remote manual shifting mechanism having a lever for engaging selected gear combinations of a motor transmission of the type having an opening through the casing thereof providing access to rail members therewithin whose positioning and movement enables the engagement of the gear combinations selected, said mechanism comprising;

a slideable body member adapted to slide in opposite directions along a defined path with respect to the transmission casing, a rotatable body member having one end pivotally mounted to the transmission casing and an opposite end pivotally mounted to an end of the slideable body member, means enabling said slidable body member to rotate about the end thereof that is pivotally mounted to the rotatable body member in such a manner as to restrict movement of the slidable body member to the defined path and cause an opposite end thereof to move in opposite directions along an arcuate path that is generally transverse to the defined path, a protuberance extending from said slidable body member opposite end through the opening in the transmission casing, said protuberance able to be positioned adjacent a particular rail member selected in response to the movement of said slidable body member opposite end along the arcuate path, and means connecting the control lever to the slidable body member in such a manner that movement of the control lever in opposite directions along a first axis causes the slidable body member to rotate about the pivotal mounting between the slideable member and the rotatable member and cause the opposite end thereof to move along the arcuate path in the direction desired so as to position the protuberance adjacent the selected rail member and movement of the control lever in opposite directions along a second axis that is different from the first axis causes the slidable body member to cause the rotatable member to rotate about the pivotal mounting between the rotatable member and the transmission casing to enable the slidable body member to slide along the defined path in the direction desired for a distance sufficient to cause the protuberance to engage upon and move the selected rail member sufficiently to engage the gear combinations resulting from the movement of said selected rail member.

2. A remote manual shifting mechanism for engaging selected gear combinations of a motor transmission of the type having an opening through the casing thereof providing access to rail members therewithin whose positioning and movement enables the engagement of the particular gear combinations selected, said mechanism comprising;

a rotatable body member pivotally mounted to the transmission casing, a slideable body member having one end thereof pivotally mounted to an end of the rotatable body member on one side of the rotatable mounting between the rotatable body member and the transmission casing, said slideable body member able to slide in opposite directions along a defined path with respect to the transmission casing and having an opposite end thereof that is able to move in opposite directions along an arcuate path that is generally transverse to the defined path, a protuberance extending from said slideable body member opposite end through the opening in the transmission casing, said protuberance able to be positioned adjacent a particular rail member selected in response to the movement of said slideable body member opposite end along the arcuate path, means connecting the control lever to the slideable body member in such a manner that movement of the control lever in opposite directions along a first axis causes said slideable body member to rotate about the pivotal mounting between the rotatable member and the slideable body member and cause the opposite end thereof to move along the arcuate path in the direction desired so as to position the protuberance adjacent the selected rail member and movement of the control lever in one opposite direction along a second axis that is different from the first axis causes the slideable body member to slide in one direction along the defind path for a distance, sufficient to cause the protuberance to impinge upon and move the selected rail member sufficiently to engage the gear combination resulting from the movement of said rail member, and means connecting the control lever to the rotatable body member on an opposite side of the pivotal mounting between the rotatable body member and the transmission casing, in such a manner that movement of the control lever along the second axis in a direction opposite to said one direction causes said rotatable body member to rotate and cause said slideable body member to slide in an opposite direction along the defined path for a distance sufficient to cause the protuberance to impinge upon and move the selected rail member sufficiently to engage the gear combination resulting from the movement of said rail member.

3. The mechanism of claim 1 wherein the connecting means comprises a pair of flexible cables that connect the control lever to the slideable body member in such a manner that movement of the control lever in one direction along a first axis causes one of the cables to rotate said slideable body member opposite end in one direction about the pivotal mounting between the rotatable body member and the slideable body member and movement of the control lever in the opposite direction along the first axis causes the other cable to rotate said slideable body member opposite end in an opposite direction about the pivotal mounting between the rotatable body member and the slideable body member and movement of the control lever in opposite directions along the second axis causes both of the cables to slide the slideable body member in the direction desired along the defined path.

4. The mechanism of claim 2 wherein the means connecting the rotatable body member to the control lever comprises a flexible cable and the means connecting the slideable body member to the control lever comprises a pair of flexible cables such that movement of the control lever in the one direction along the first axis causes one of the pair of cables to rotate said slideable body member opposite end in one direction about the pivotal mounting of said one end thereof to said rotatable body member and movement of the control lever in the opposite direction along the first axis causes the other of the pair of cables to rotate said slideable body member opposite end in an opposite direction about the pivotal securement of said slideable body member one end to said rotatable body member and the movement of the control lever in the one direction along the second axis causes both of the pair of cables to slide said slideable body member in one direction along the defined path and the movement of the control lever in the opposite direction along the second axis causes the cable connecting the control lever to said rotatable body member to rotate said rotatable body member and cause said slideable body member to slide in an opposite direction along the defined path.

5. The mechanism of claim 3 or 4 wherein at least one of the cables is disposed within an outer protective jacket that is secured against movement with respect to the transmission casing.

6. The mechanism of claim 1 including a protective housing disposed about the slideable body member and secured to the transmission casing, said housing having at least enough access openings through the wall thereof to enable the connecting means to connect the control lever to said body member.

7. The mechanism of claim 2 including a protective housing disposed about the rotatable and slideable body members and secured to the transmission casing, said housing having at least enough access openings through the wall thereof to enable the connecting means to connect the control lever to said rotatable and slideable body members.

8. The mechanism of claim 6 or 7 wherein the housing has a bottom wall having an opening therethrough adapted to enable the protuberance to extend through the opening in the transmission casing.

9. The mechanism of claim 7 wherein the rotatable body member is pivotally secured to the transmission casing by being pivotally secured to the housing.

10. The mechanism of claim 1 wherein the rotatable member is pivotally mounted to the transmission casing by being pivotally mounted to the housing.

11. The mechanism of claim 1 including means for preventing vertical loading on said slideable body member pivotal mounting.

12. The mechanism of claim 2 including means for preventing vertical loading on the pivotal mounting between said rotatable and said slideable body members.

13. The mechanism of claim 11 or 12 wherein the means for preventing vertical loading comprises an open ended channel through which the opposite end of said slideable member extends, said channel having a pair of side walls secured to said transmission casing and spaced apart for a distance sufficient to enable said slideable body member opposite end to move along the arcuate path and having a top secured to said side walls for preventing said slideable body member opposite end from springing away from said transmission casing.

14. The mechanism of claim 13 wherein the open ended channel includes a bottom wall having an opening therethrough adapted to provide access to said transmission casing opening, said bottom wall having a bearing surface upon which said slideable member is able to slide.

* * * * *